United States Patent [19]

Katoh et al.

[11] Patent Number: 4,759,128
[45] Date of Patent: Jul. 26, 1988

[54] TRANSMISSION DEVICE

[75] Inventors: Hiroshi Katoh, Fussa; Toshio Akashi, Omiya; Toshiharu Sawada, Fuchu; Takanori Ebunuma, Higashiyamato, all of Japan

[73] Assignee: Komatsu Zenoah Co., Japan

[21] Appl. No.: 12,449

[22] Filed: Feb. 9, 1987

[30] Foreign Application Priority Data

Feb. 13, 1986 [JP] Japan ............................ 61-018176[U]
Apr. 15, 1986 [JP] Japan ............................ 61-055307[U]

[51] Int. Cl.$^4$ ........................ A01G 3/06; A01D 34/63
[52] U.S. Cl. .......................................... 30/276; 56/12.7
[58] Field of Search .............. 30/296 R, 276; 56/12.7; 248/562

[56] References Cited

U.S. PATENT DOCUMENTS

| | | |
|---|---|---|
| 3,977,078 | 8/1976 | Pittinger . |
| 4,006,528 | 2/1977 | Katsuya . |
| 4,126,928 | 11/1978 | Hoff . |
| 4,226,021 | 10/1980 | Hoff . |
| 4,236,310 | 12/1980 | Muller . |
| 4,286,675 | 9/1981 | Tuggle . |
| 4,335,585 | 6/1982 | Hoff . |
| 4,586,322 | 5/1986 | Yokocho ...................... 30/276 X |

*Primary Examiner*—Frank T. Yost
*Assistant Examiner*—Michael D. Folkerts
*Attorney, Agent, or Firm*—Jones, Askew & Lunsford

[57] ABSTRACT

A transmission device adopted for a working tool such as a weed cutter having an engine, a rotary blade, and a gear case for supporting the rotary blade. The transmission device comprises an operation pipe for connecting the engine with the gear case, a transmission shaft disposed inside the operation pipe to transmit the torque of the engine to the rotary blade, and a bearing pipe interposed between the operation pipe and the transmission shaft. The inner surface of the bearing pipe contacts with the outer surface of the transmission shaft to support the transmission shaft rotatably. A plurality of grooves are formed circumferentially on the inner surface of the bearing pipe with predetermined intervals to reduce the contacting area thereof with respect to the transmission shaft. The transmission device further comprises a vibration isolator which is fixed to an end of the operation pipe and removably engaged with a clutch housing of the engine.

4 Claims, 7 Drawing Sheets

TRANSMISSION DEVICE

BACKGROUND OF THE INVENTION

1. Field of the Invention

The present invention relates generally to a transmission device for transmitting the torque of an engine to an output device, and particularly to a transmission device adopted for a working tool such as a weed cutter having an engine, a rotary blade, and a gear case for supporting the rotary blade rotatably, wherein the transmission device comprises an operation pipe for connecting the gear case with the engine and a transmission shaft disposed inside the operation pipe to transmit the engine torque to the rotary blade via the gear case. As another feature of the present invention, the transmission device comprises a vibration isolator interposed between the operation pipe and a clutch housing of the engine.

2. Description of the Prior Art

FIG. 1 shows a transmission device according to a prior art. This transmission device may be adopted for a weed cutter which is generally shown in FIG. 2. This prior art transmission device comprises an operation pipe 7 for connecting an engine 5 with a rotary blade 1 through a gear case 3, a transmission shaft 15 disposed inside the operation pipe 7, and a bearing pipe 9 also disposed inside the operation pipe 7 to surround and support the transmission shaft 15 rotatably. The bearing pipe 9 is disposed coaxially inside the operation pipe 7 to continuously support the total length of the transmission shaft 15.

In such a bearing structure, the contacting area between the outer surface of the transmission shaft 15 and the inner surface of the bearing pipe 9 is large so that the frictional resistance between them will excessively be large to increase the transmission loss of torque. As a result, the deterioration of acceleration capability, the lack of revolution speed in a high-speed range, and the excessive heating of the operation pipe due to the frictional heating may be caused in the weed cutter provided with such a prior art transmission device.

FIG. 1(B) is a view showing a vibration isolating connection between the operation pipe 7 and a clutch housing of the engine 5 according to the prior art. In the figure, a vibration isolator 201 made of rubber, etc., for preventing vibrations generated by the engine 5 from propagating to the operation pipe 7 is fixed by heat sealing or adhesion to the periphery of an inner cylinder 203. The inner cylinder 203 has grooves 205 and is engaged with an end of the operation pipe 7. After the engagement, the inner cylinder 203 is tightened by a clamp 207 at the grooves 205 such that the inner cylinder 203 is fixed to the operation pipe 7. The periphery of the vibration isolator 201 is provided with projections 209 formed in an axial direction to removably engage with grooves 211 formed in an axial direction on a cylindrical portion 213 of a clutch housing 215 of the engine 5.

According to this arrangement of the prior art, there are many parts to be assembled for constituting the vibration isolating connection between the operation pipe 7 and the clutch housing 215 of the engine 5 so that the assembling work may be bothersome, and the total weight increased.

SUMMARY OF THE INVENTION

An object of the present invention is to provide a transmission device to be adopted for a weed cutter, having a small contact area between a bearing pipe and a transmission shaft to reduce the frictional resistance between them and to prevent the deterioration of acceleration capability, the loss of torque, the lack of revolution speed in a high-speed range, and the heating of the bearing pipe from occurring in the weed cutter.

The other object of the present invention is to provide a transmission device to be adopted for a weed cutter, having a vibration isolating connection between an operation pipe and a clutch housing of an engine of the weed cutter, the vibration isolating connection comprising a small number of parts which are easy to assemble to reduce the total weight of the weed cutter.

In order to accomplish the objects and advantages mentioned in the above, the present invention provides a transmission device to be adopted for a weed cutter, the transmission device comprising an operation pipe for connecting the engine with the gear case, a transmission shaft disposed inside the operation pipe to transmit the torque of the engine to the rotary blade, and a bearing pipe interposed between the operation pipe and the transmission shaft. The inner surface of the bearing pipe contacts with the outer surface of the transmission shaft to support the transmission shaft rotatably. A plurality of grooves are formed circumferentially on the inner surface of the bearing pipe with predetermined intervals to reduce the contacting area thereof with respect to the transmission shaft.

Further, the transmission device comprises a vibration isolator which is fixed to an end of the operation pipe and removably engaged with a clutch housing of the engine.

BRIEF DESCRIPTION OF THE DRAWINGS

These and other objects, features and advantages of the present invention will become apparent from the following descriptions of preferred embodiments taken in conjunction with the accompanying drawings in which.

DETAILED DESCRIPTION OF THE EMBODIMENTS

Figure 1:
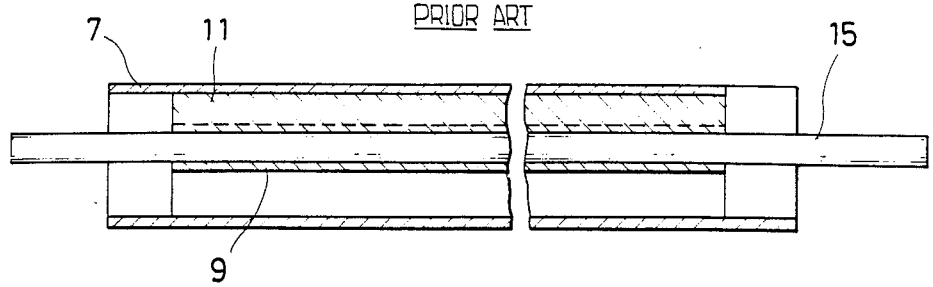
FIG. 1 is a cross-sectional side view showing a transmission device of a weed cutter according to a prior art.

A first embodiment of the present invention will be described with reference to FIGS. 2 to 4. In the figures, a rotary blade 1 is rotatably supported by a gear case 3 and partly covered by a blade cover 4 which protects the rotary blade 1 from being damaged when the weed cutter 2 is placed on the ground. The blade 1 is connected via the gear case 3 with an engine 5 by an operation pipe 7. A fuel tank 6 is arranged on top of the engine 5.

Inside the operation pipe 7, there is disposed a bearing pipe 9' which is made of synthetic resin and extends along the total length of the operation pipe 7 to surround a transmission shaft 15 for transmitting torque from the engine 5 to the rotary blade 1. A plurality of radial support plates 11 are integrally formed with an outer surface of the bearing pipe 9' and extend along the total length of the bearing pipe 9' to support the bearing pipe 9' with respect to the inner surface of the operation pipe 7. The bearing pipe 9' is provided with a plurality of grooves 13 which are circumferentially formed on the inner surface of the bearing pipe 9' with substantially equal intervals to reduce a contacting area between the inner surface of the bearing pipe 9' and the outer surface of the transmission shaft 15. The transmission shaft 15 passes through the bearing pipe 9' and engages with the gear case 3 and the engine 5 to transmit the torque of the engine 5 to the rotary blade 1.

The bearing pipe 9' is divided into several segments at the positions of respective grooves 13 along dividing planes 17 so that a metal mold for forming each of the segments with synthetic resin may have a simple shape. The respective segments of the bearing pipe 9' are successively inserted into the operation pipe 7 to complete the bearing pipe 9'.

Figure 5:
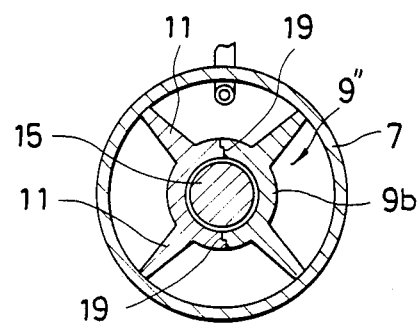
FIG. 5 is a cross-sectional front view showing a transmission device according to a second embodiment of the present invention.

FIG. 5 shows a second embodiment of the present invention, in which the bearing pipe 9" is divided into bearing pipe segments along a dividing plane 19 including an axial center line to simplify the shape of a metal mold for forming each bearing pipe segment with synthetic resin.

In operation, the weed cutter 2 is suspended from a shoulder of an operator through a shoulder band (not shown) attached to a hanger 20, and held by hands with grips 24 of a handle 25. The torque of the engine 5 is transmitted to the rotary blade 1 through the transmission shaft 15 to rotate the rotary blade 1. A gap between the transmission shaft 15 and the bearing pipe 9' (9") is large at the position of each of the grooves 13 and small at the position of each of bearing portions so that the contact area between the bearing pipe 9' (9") and the transmission shaft 15 may be reduced and the frictional resistance also reduced to cause the torque loss to be small.

Figure 2:
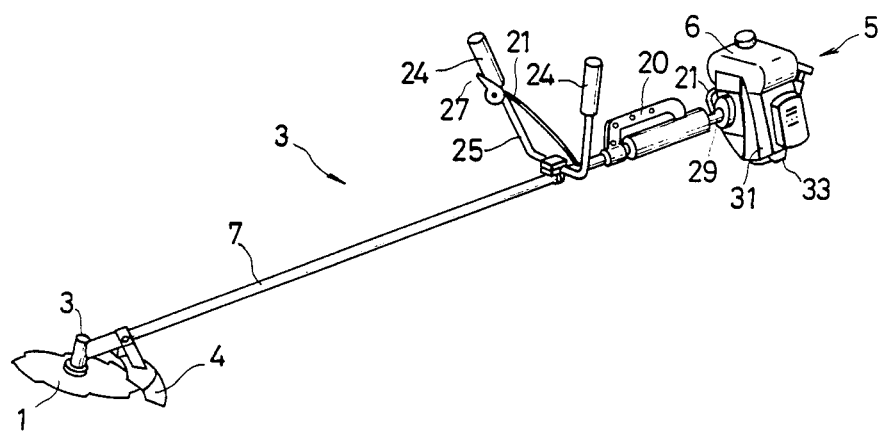
FIG. 2 is a perspective general view showing a weed cutter.
Figure 3:
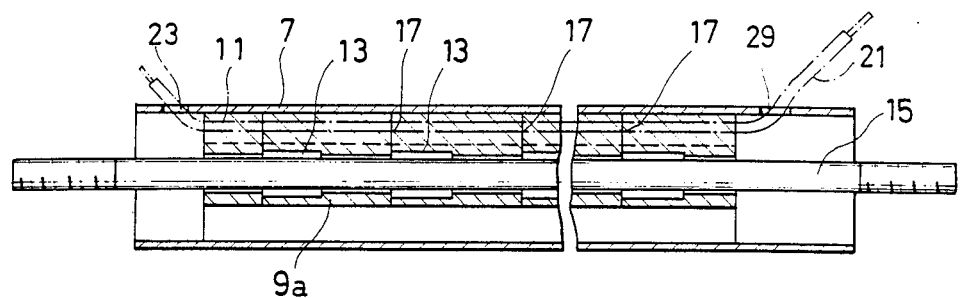
FIG. 3 is a cross-sectional side view showing a transmission device according to a first embodiment of the present invention.
Figure 4:
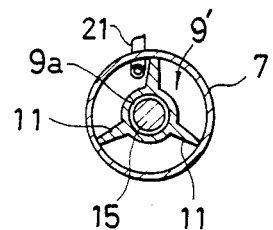
FIG. 4 is a cross-sectional front view showing the transmission device shown in FIG. 3.

In FIGS. 2 to 4, a reference numeral 21 represents a cable for performing a throttle operation. One end of the cable 21 is connected to a throttle lever 27, and the other end thereof enters into a hole 23 formed on the operation pipe 7, passes through a hollow portion defined by the operation pipe 7, the bearing pipe 9' (9"), and the adjacent support plates 11, comes out of another hole 29 formed on the operation pipe 7, and is connected to a throttle device (not shown) of the engine 5. Due to this arrangement of the cable 21 inside the operation pipe 7, the cable 21 will not be caught by outside obstacles such as trees and twigs.

Figure 6:
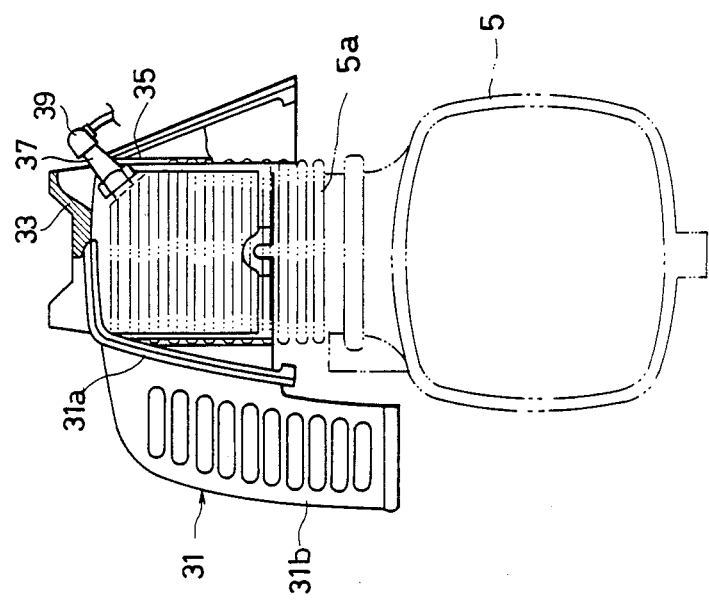
FIG. 6 is an upside-down view showing an engine cover attached to an engine of the weed cutter shown in FIG. 2.

FIG. 6 is an upside-down view showing the detail of an engine cover 31 of the engine 5. The engine cover 31 attached to an engine cylinder 5a comprises a cover member 31a for covering the engine cylinder 5a, and a cover member 31b for covering related members (not shown) connected to the engine 5. A pair of projections 33 having the same height is formed integrally with the cover member 31a at the top of the cover member 31a. A plug hole 35 of substantially circular shape is formed at a corner of the top of the cover member 31a. An ignition plug 37 may be attached to and removed from the engine cylinder 5a through the plug hole 35. A numeral 39 represents a plug cap attached to the top of the ignition plug 37.

To start the engine 5 or to fill the fuel tank 6 with fuel, the weed cutter 2 is placed on the ground with the projections 33 being at the bottom. At this time, a gap is formed between the top of the ignition plug 37 and the ground due to the interposition of the projections 33 so that the ignition plug 37 may be prevented from hitting the ground and being damaged.

Figure 7:
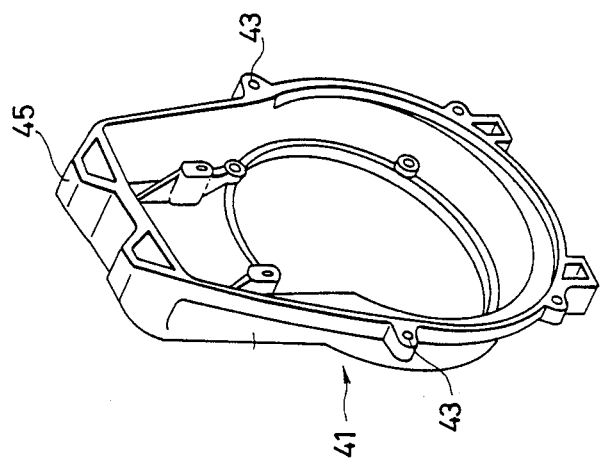
FIG. 7 is a perspective view showing a fan cover attached to the engine of the weed cutter shown in FIG. 2.

FIG. 7 shows a modification of the projections 33 shown in FIG. 6. In this modification, projections 45 for protecting the ignition plug 37 are provided on a fan cover 41 which is fitted to the engine 5 on the opposite side of the transmission shaft 15 by bolts which are inserted into fitting holes 43.

Figure 8:
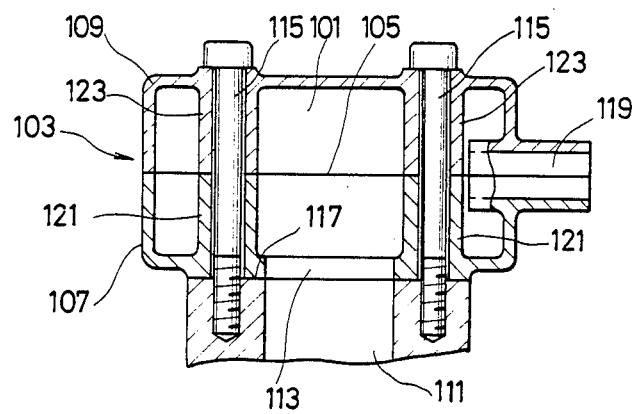
FIG. 8 is a cross-sectional side view showing a muffler attached to the engine of the weed cutter shown in FIG. 2.
Figure 9:
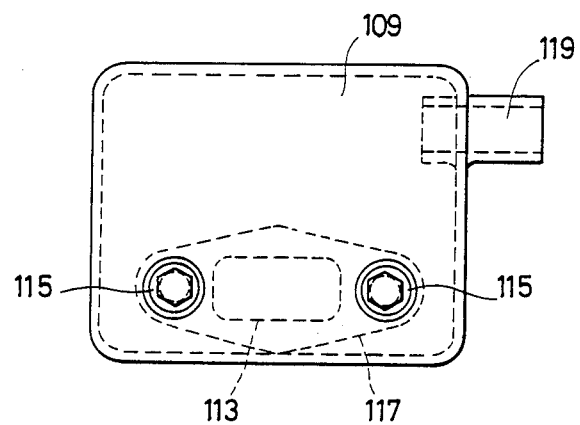
FIG. 9 is a plan view showing the muffler shown in FIG. 8.

FIGS. 8 and 9 show a muffler of the engine 5. A muffler case 103 comprises a body case 107 and a cap case 109 which are cast by aluminum alloy and fitted together along a dividing plane 105 to form the muffler case 103. A muffling chamber 101 is formed inside the muffler case 103. A communication hole 113 of the body case 107 communicates with an exhaust port 111 of the engine 5. The body case 107 and the cap case 109 are fixed to a flange 117 of the exhaust port 111 by bolts 115. An exhaust pipe 119 comprises two portions which are formed integrally with the body case 107 and the cap case 109 respectively and fitted together along the dividing plane 105 when the body case 107 and the cap case 109 are fitted together. Also integrally formed with the body case 107 and the cap case 109 respectively are reinforcing cylinders 121 and 123 which are arranged around the bolts 115 and abut against each other along the dividing plane 105.

An exhaust gas from the engine 5 enters into the muffling chamber 101 through the exhaust port 111 and the communication hole 113, is expanded in the muffling chamber 101, contracted by the exhaust pipe 119, and discharged outside therefrom to be expanded. Due to the expansion and the contraction, and due to the reflection and interference in the muffler 103 and the exhaust pipe 119, the exhaust noise can be silenced.

Figure 1B:
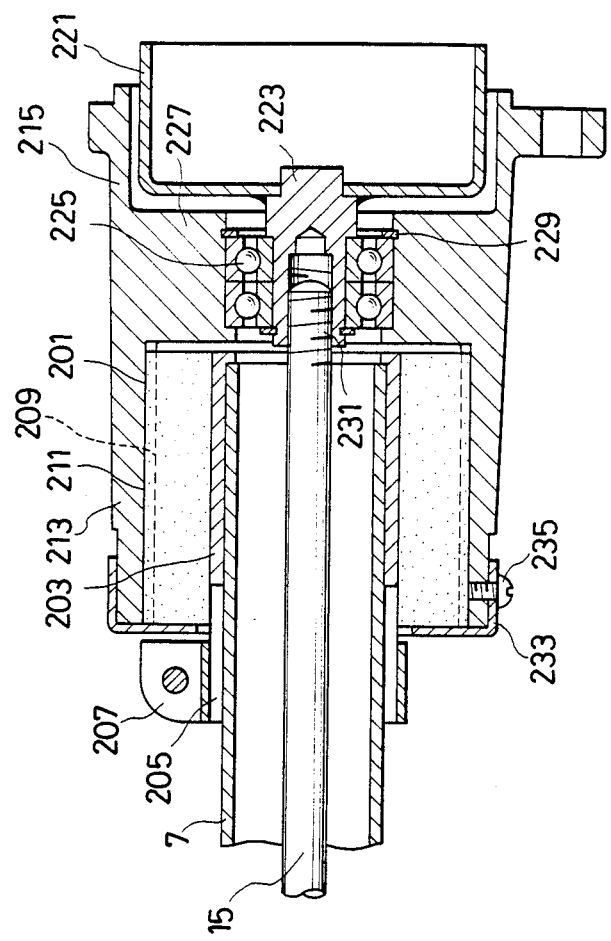
FIG. 1(B) is a cross-sectional side view showing a vibration isolating connection according to the prior art.
Figure 10:
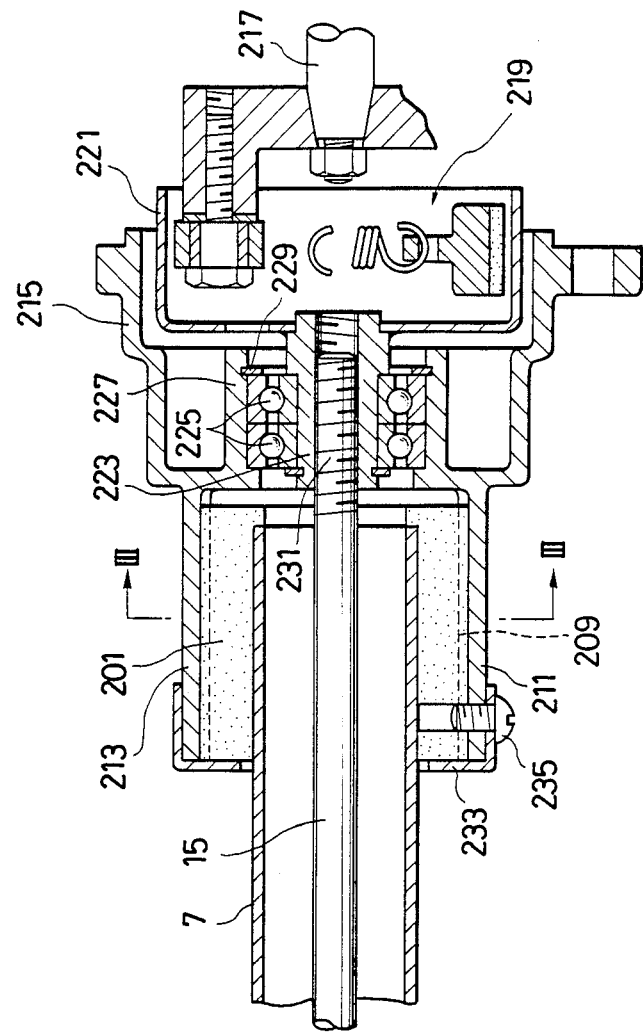
FIG. 10 is a cross-sectional side view showing an embodiment of a vibration isolating connection of the weed cutter according to the present invention.
Figure 11:
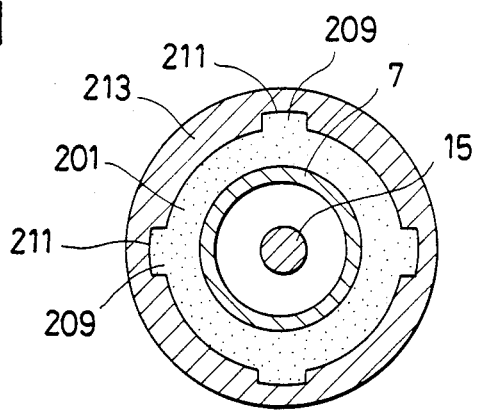
FIG. 11 is a cross-sectional front view taken along the line III—III shown in FIG. 10.

FIGS. 10 and 11 show an embodiment of a vibration isolating connection according to the present invention. In FIG. 10, the same reference numerals as those shown in previous figures, particularly in FIGS. 1(B) and 2 represent the corresponding parts.

In the figures, one end of a crank shaft 217 of the engine 5 is provided with a clutch 219 which is connected by a centrifugal force to a clutch drum 221 disposed adjacent to the periphery of the clutch 219. A boss portion 223 of the clutch drum 221 is supported by a bearing 225, which is supported by a bearing portion 227 of a clutch housing 215. Further, the bearing 225 is fitted to the bearing portion 227 by a snap ring 229. One end of the transmission shaft 15 is fitted to the boss portion 223 with a spline 231. Fixed by heat sealing to the periphery of one end of the operation pipe 7 is a vibration isolator 201 made of rubber. The periphery of the vibration isolator 201 is provided with projections 209 extending in an axial direction. The projections 209 engage with grooves 211 provided in an axial direction on the inner surface of a cylindrical portion 213 of the clutch housing 215. An end portion of the cylindrical portion 213 is engaged with a cap 233 and fixed by a bolt 235.

According to the above arrangement, when the engine 5 is driven to carry out the cutting work of weeds and bushes by rotating the rotary blade 1, the vibration isolator 201 absorbs vibrations generated by the engine 5 to prevent them from being transmitted to the operation pipe 7.

Figure 12:
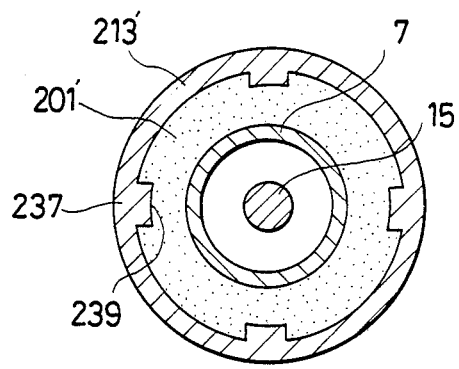
FIG. 12 is a cross-sectional front view showing a modification of the vibration isolating connection of the weed cutter according to the present invention.

FIG. 12 is a cross-sectional front view showing a modification of the vibration isolator. In this modification, grooves 237 are formed on a vibration isolator 201' to receive projections 239 formed on a cylindrical portion 213'.

Figure 13:
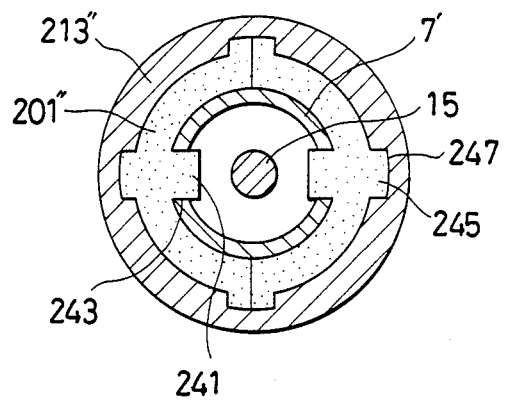
FIG. 13 is a cross-sectional front view showing another modification of the vibration isolating connection of the weed cutter according to the present invention.

FIG. 13 is a cross-sectional front view showing another modification of the vibration isolator. In this modification, a vibration isolator 201" is divided into two portions along a dividing plane in an axial direction, and inward projections 241 formed on the inner surface of the vibration isolator 201" are fitted to notches 243 provided on an operation pipe 7'. Outward projections 245 formed on the outer surface of the vibration isolator 201" are fitted to grooves 247 formed in an axial direction on the inner surface of a cylindrical portion 213".

According to the above arrangement, in comparison with the vibration isolating connection of the prior art device shown in FIG. 1(B), the number of parts of the vibration isolating connection will be reduced to make the assembling work thereof easy, the total weight reduced, and the operation pipe held strongly to perform the cutting work smoothly.

What is claimed is:

1. A transmission device for a working tool such as a weed cutter having an engine with a clutch housing, a rotary blade and a gear case for supporting said rotary blade, said transmission device comprising:
   an operation pipe for connecting said engine with said gear case, said operation pipe having an end around which a plurality of notches are axially formed;
   a transmission shaft disposed inside said operation pipe and extending along the total length of said operation pipe to transmit the torque of said engine to said rotary blade:
   a vibration isolator having an outer surface and an inner surface interposed between said operation pipe and said clutch housing;
   said clutch housing having an inner surface with a plurality of grooves formed in the axial direction thereon;
   said vibration isolator being fixed to said end of said operation pipe opposite to said gear case and removably engaged with said clutch housing;
   said vibration isolator further comprising a plurality of inward projections axially formed on said inner surface thereof and engaged with said notches on said operation pipe; and
   a plurality of outward projections axially formed on said outer surface of said vibration isolator and engaged with said grooves of said clutch housing, thereby preventing rotation of said operation pipe with respect to said clutch housing.

2. A transmission device as claimed in claim 1, wherein said vibration isolator is heat-sealed to said operation pipe.

3. A transmission device as claimed in claim 1, wherein said vibration isolator is divided into at least two portions along a dividing plane in an axial direction.

4. A transmission device as in claim 3, wherein the portions of said vibration isolator are heat-sealed to said operation pipe.

* * * * *